United States Patent

[11] 3,597,060

| [72] | Inventor | Don L. Beaman<br>Sunnyvale, Calif. |
|---|---|---|
| [21] | Appl. No. | 761,911 |
| [22] | Filed | Sept. 24, 1968 |
| [45] | Patented | Aug. 3, 1971 |
| [73] | Assignee | Red Lake Laboratories<br>Santa Clara, Calif. |

[54] CAMERA HAVING A HIGH SPEED DRIVE SYSTEM
19 Claims, 6 Drawing Figs.

[52] U.S. Cl. .................................................. 352/84
[51] Int. Cl. ............................................... G03b 41/00
[50] Field of Search ........................................ 352/84,
180, 29, 30; 242/75.51; 95/12.5

[56] References Cited
UNITED STATES PATENTS

| 2,685,417 | 3/1953 | Calvin | 352/184 |
| 2,676,023 | 4/1954 | Isom | 352/29 X |
| 2,685,417 | 8/1954 | Bartelson | 352/180 X |

*Primary Examiner*—Donald O. Woodiel
*Attorney*—Schapp and Hatch

ABSTRACT: A camera having a high speed drive system particularly suited for streak cameras comprising a supply spindle for holding a supply reel, a takeup spindle for holding a takeup reel, means for directing film from the supply reel through an image receiving position to the takeup reel, with both the takeup reel spindle and supply spindle being equipped with motor drive means, and control means for controlling the motor drive means in response to the difference between a desired preset speed and the actual film speed and positively assuring that the supply motor does not overdrive, said control means also being formed to reverse the takeup mechanism and supply mechanism so that the film can be driven in reverse. Preferably the motors are electric motors and the control means is an electric control circuit formed to compare a signal indicative of the film speed with a reference to drive the takeup motor at the desired speed, and also being formed to drive the supply motor from means sensing the length and tension of the film between the supply reel and the takeup reel, with the supply motor being coupled to run only when the takeup motor runs; the circuit is also formed for reversal of motor supply power to reverse the direction of the film. In addition, brake means are provided on each reel drive together with means for switching the operativeness of the brakes so that only the brake on the supply reel is active.

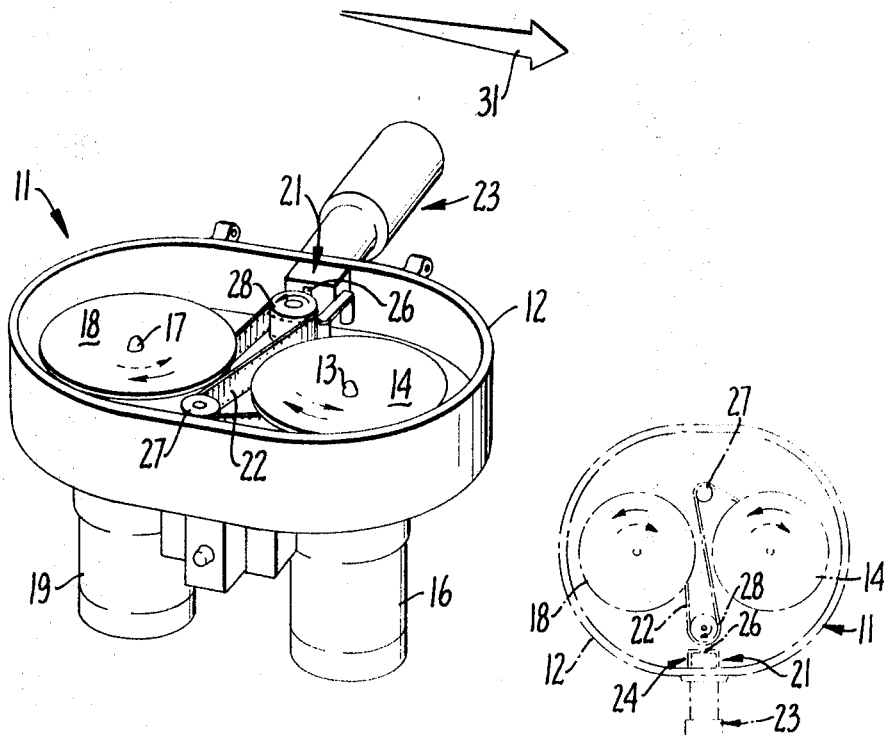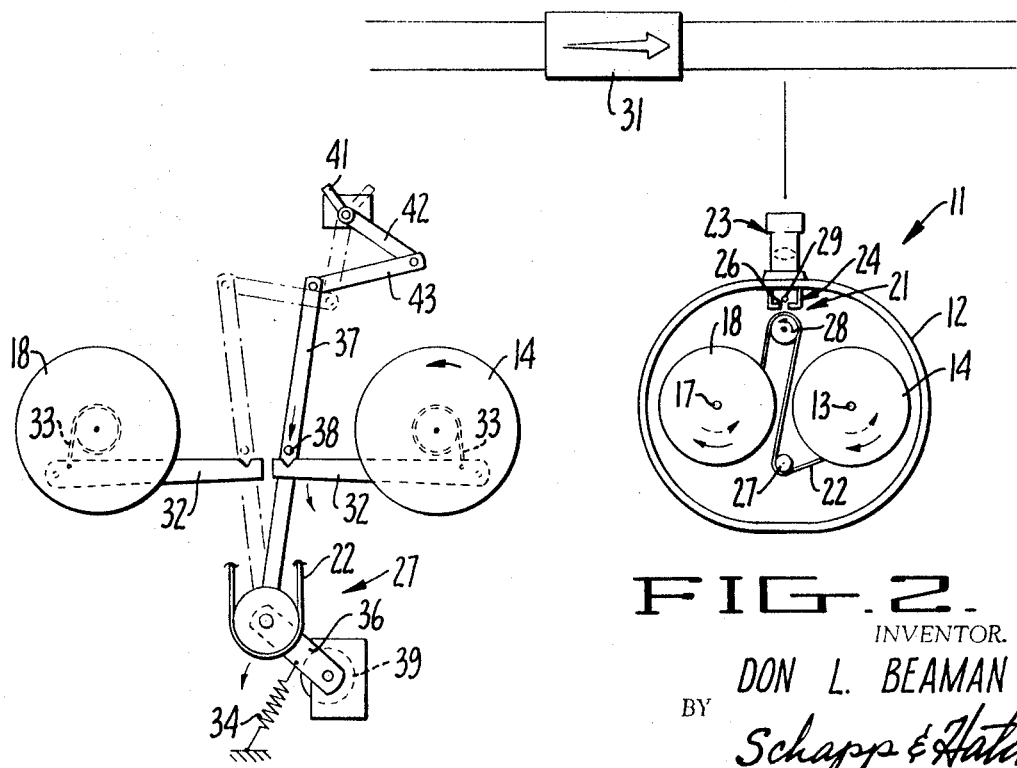

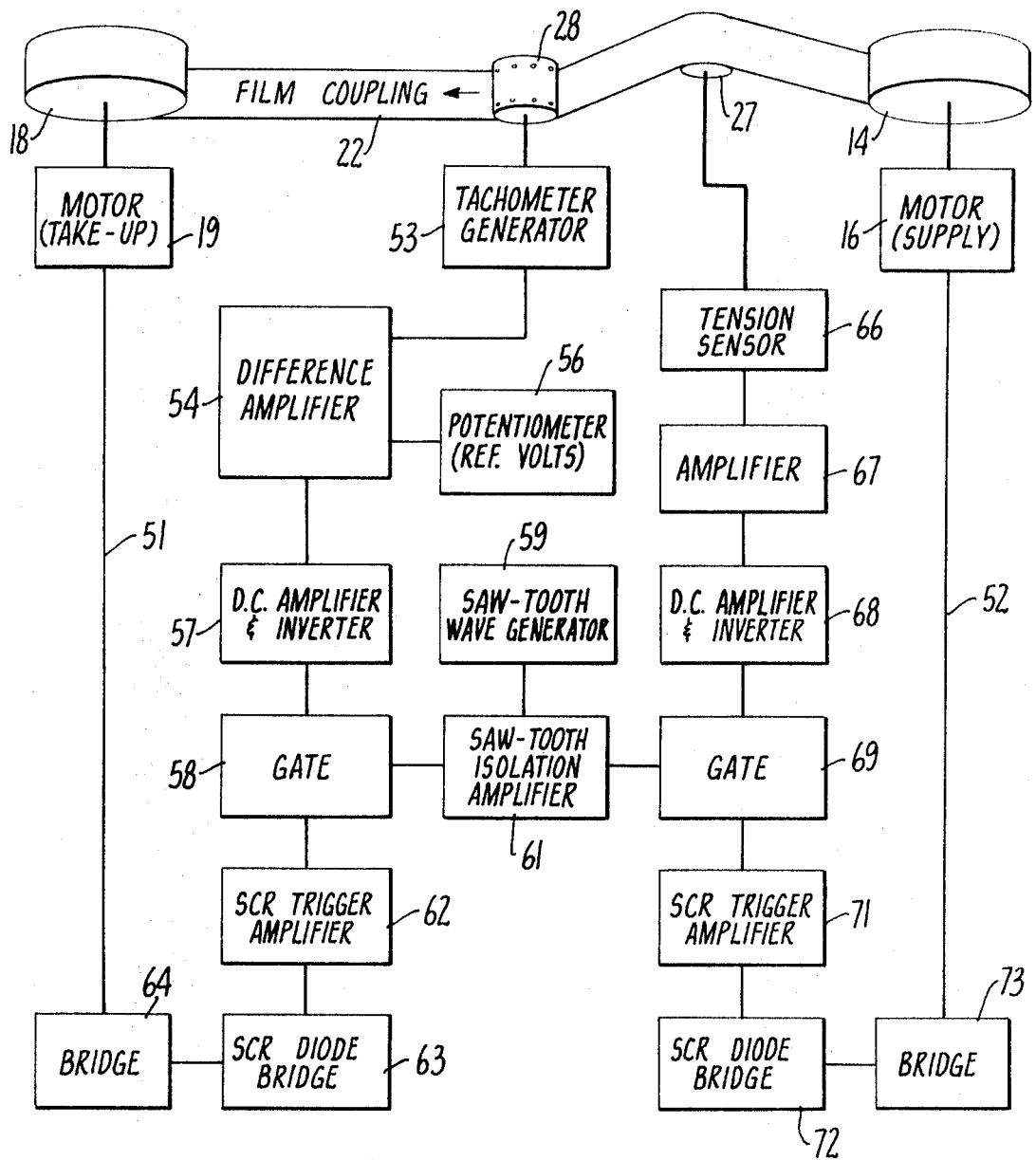
FIG. 4
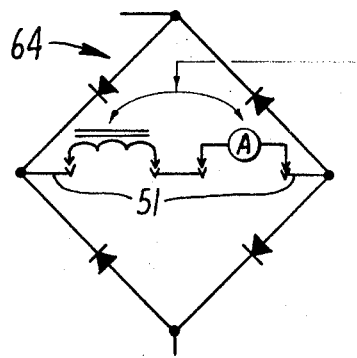
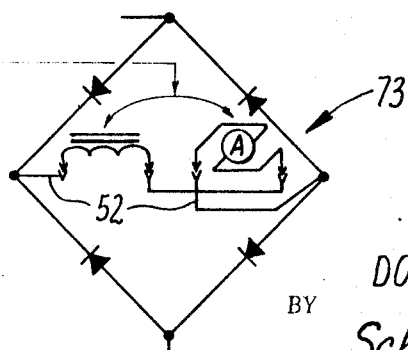
FIG. 5.

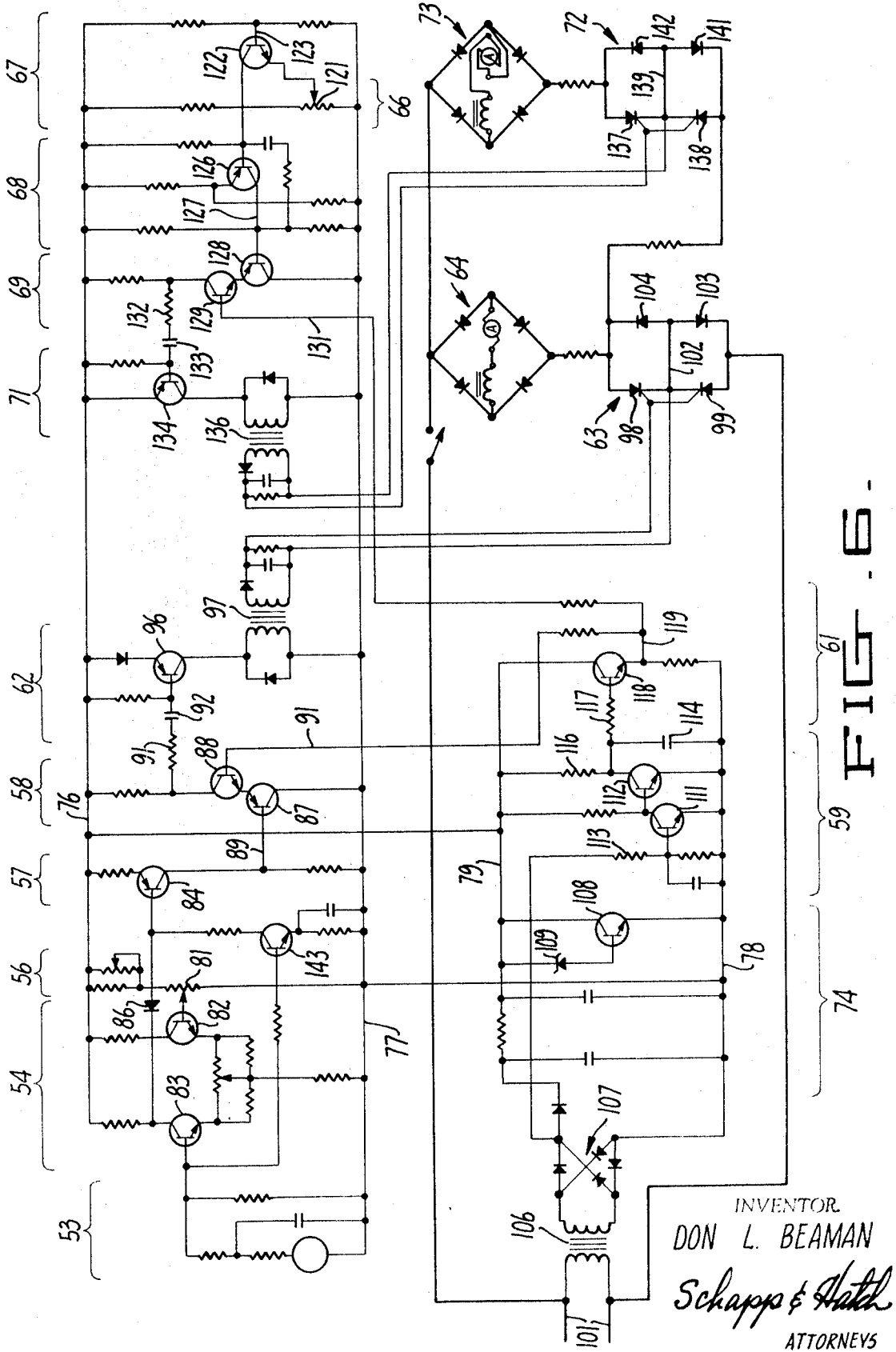

CAMERA HAVING A HIGH SPEED DRIVE SYSTEM

BACKGROUND OF THE INVENTION

The present invention relates to a CAMERA HAVING A HIGH SPEED DRIVE SYSTEM, and particularly to a high speed film drive suitable for streak cameras.

It is well known that it is important in high speed cameras to bring the film up to speed rapidly, because of the rapid rate that the film goes through the camera. In streak cameras, it is also extremely important to drive the film at a constant as well as at a high speed. It is also important to maintain the film in a controlled manner, and handle it without breakage or other damage.

Therefore most film drive systems operate by driving the takeup reel and pulling the film off of the supply reel while maintaining a drag on the supply reel. In this way, control is achieved by controlling the takeup drive and certain of the associated intermediate drive elements. However, the need to overcome the inertia in the supply reel and drag renders it more difficult to bring the film up to speed.

These problems are particularly critical in the streak camera. Such a camera operates to take a picture of a rapidly moving object by synchronizing the movement of the image from the object with the movement of the film. In this way, a good exposure is obtained even though the object being photographed is moving at a very fast speed. However, it is apparent that excellent control on the film speed is important, and that with such control, the camera is a valuable instrument capable of providing excellent data as well as providing a pictorial illustration of a high speed situation.

By way of example, a photograph of an object moving at a velocity of say Mach seven may have its image traveling at a speed of say 250 to 300 feet per second under a typical focal length of the objective lens system and a typical distance of the object from the lens. A supply reel may have say 450 feet of film on it. Thus the film speed should be brought up to the desired level in less than a second in order to prevent the wasting of an undue amount of film. By the same token, the film speed must be quickly brought to a constant velocity in matching relation very quickly.

It is also advantageous to set up the camera for the best exposure conditions, and this renders it advantageous to place the camera on one side of the device to be photographed part of the time, and on the other side during other times. For example, when taking a picture of a rocket sled with a streak camera in the morning, the sun preferably be behind the camera. However, in the afternoon, the sun will be on the other side and it will be desirable to place the camera on the other side to maintain the light source behind the camera. When the camera is reversed, but the direction of the rocket sled is not, the film must move in a reverse direction. Therefore, it is important to provide a film drive mechanism, which can drive in both directions with similarly good performance in each case.

SUMMARY OF THE INVENTION

Briefly speaking, the invention provides a drive system, in which a powered drive is provided on the supply reel as well as on the takeup reel. However, the power for the supply reel is carefully, and, in the preferred form, automatically controlled to operate as an assist to the takeup motor so that film is not pushed toward the takeup motor. The camera is also preferably constructed with similar mechanical parts so that the supply and takeup drives can be reversed simply by switching the power to the motors, and switching the brake operation. Other devices are made unitary or symmetrical so that reverse operation gives substantially the same performance as forward operation.

The control means regulating the power to the drive motors must be accurate and immediately responsive. The requirements are best achieved by an electronic control circuit operatively associated with electrical sensing devices for immediate and automatic regulation. In this way a virtually immediately responsive control is provided in a camera having both the takeup reel and supply reel powered, yet the control is operative for moving the film in either a forward or a reverse direction.

In addition, the camera is supplied with the usual controls and accessories. For example, the desired film speed is set manually to adjust the control means for enabling the control means to positively and rapidly achieve the preset speed. The invention is particularly suitable for streak cameras, where film speed control is particularly important, and where reversal of film movement is particularly desirable. In such cameras, a timing light is usually provided, and it may be utilized in a streak camera construction according to the invention, with the light being operatively effective regardless of the direction of film movement through the exposure area.

Accordingly, it is a primary object of this invention to provide a high speed film drive system, which is capable of rapidly attaining the desired velocity and quickly settling to a substantially uniform velocity.

Another object of the invention is the provision of a high speed film drive, which can be driven in both directions, and which can attain the desired velocity rapidly in both situations.

A further object of the invention is to provide such a high speed film drive, which is reliable in operation and which is constructed with a minimum of mechanical components.

Further objects and advantages will appear as the specification continues, and the new and useful features of the camera having a high speed drive system will be more fully defined in the claims attached hereto.

BRIEF DESCRIPTION OF THE DRAWINGS

The preferred form of the invention is illustrated in the accompanying drawings forming part of this specification, in which:

FIG. 1 is a perspective view of a typical camera constructed according to the invention with the top portion of the housing being removed to better illustrate internal parts.

FIG. 2 is a diagrammatic view illustrating two typical camera positions while in use, with the cameras being enlarged and shown internally as seen from above in order to better illustrate the film travel in each position.

FIG. 3 is a schematic view illustrating a typical mechanical brake mechanism that may be used in the present invention showing the brake switching capability whereby the braking action is shifted from one reel to the other.

FIG. 4 is a block diagram of the electronic circuit and components related thereto utilized in the camera illustrated in FIGS. 1 through 3.

FIG. 5 is a diagrammatic view of the motor plug arrangements utilized to provide reverse driving.

FIG. 6 is a schematic diagram of the electronic circuit of the film speed control of the camera illustrated in FIGS. 1 through 5.

While only the preferred form of the invention is shown, it should be understood that various changes or modifications may be made within the scope of the claims attached hereto without departing from the spirit of the invention.

DESCRIPTION OF THE PREFERRED EMBODIMENT

Referring to the drawings in greater detail and more particularly to FIG. 1, a streak camera 11 having a high speed drive system is shown. The camera comprises a housing 12, a supply spindle 13 formed for supporting a film feed spool 14, a film supply motor 16 connected in driving relation to said supply spindle and associated spool, a takeup spindle 17 adapted for supporting a film takeup spool 18, and a takeup motor 19 connected in driving relation to said takeup spindle. As best seen in FIG. 2, the camera 11 also comprises a film gate means 21 mounted in the housing 12 and formed for supporting film 22 as it is passed therethrough in moving from the supply spool to the takeup spool. Optical means 23 are also provided, which include a typical objective lens system which is formed to receive a beam of light and to direct the beam of light in focused relation onto the film at the film gate means. In addition, aperture means 24 are mounted in the housing and comprise a slit 26 having its length extending across the film and perpendicular to the direction of film travel.

It will be observed that in the drive position shown in FIG. 1 and the lower portion of FIG. 2, the film will pass from the feed spool 14 around a film tension sensing means 27, around the sprocket 28 which serves to hold the film in the desired position for exposure, and thence back to the takeup spool 18. A control means in the form of an electronic circuit is also provided to rapidly drive the takeup motor 19 and film supply motor 16 from a halted beginning position to a predetermined substantially uniform velocity until the film is completely exposed as desired.

The takeup motor is directed to drive at a speed sufficient to pass the film through the exposed position at the desired linear speed, and therefore sprocket 28 has an associated speed detecting means formed to provide an electric signal comparable with a preset reference and usable for speeding up or slowing down the motor 19 as desired. The supply motor 16 is driven to assist the takeup motor and reduce the amount of work required by the takeup motor, but at the same time it is important to assure that the supply motor operates in a dependent manner and does not drive ahead of the takeup motor.

Thus, the supply motor is placed in a circuit in a dependent condition so that the supply motor cannot be operative unless the takeup motor is operative. In addition, the supply motor is provided with energy in accordance with the shortening or lengthening of the film 22 extending around film tension sensing means 27 and sprocket 28, this length and the film tension being directly related. Accordingly, when the takeup motor gets ahead of the supply motor, the film is drawn tighter, tension increases, and the supply motor receives more energy. When the takeup motor gets behind the supply motor, the film becomes less taut and the supply motor will receive less energy or no energy at all.

The film tension sensing means 27 is spring mounted so that it will move yieldably and take up any differences in the film length discussed above and keep the film taut all the time the film is driven. At the same time, the position of the film tension sensing mechanism or spring tension, or any other related factor will provide an electrical signal therefrom operative through the control circuit to provide the desired drive for the supply motor.

Referring now to FIGS. 4, the block diagram shows a suitable electronic speed control circuit coupled into the mechanical elements for automatic cooperative control thereof. Thus the takeup motor 19 is shown coupled into the control circuit through supply line 51 and the takeup motor drives takeup spool 18. The takeup spool draws the film 22 over sprocket 28, against a film tension sensing means 27, and from feed spool 14. Feed spool 14 is given auxiliary power drive by supply motor 16 which receives energy supply from line 52, which in turn is controlled by the electronic control circuit.

In order to control the speed of takeup motor 19, a speed sensing device is associated with sprocket 28. This speed sensing device may be any device capable of converting the lineal film speed into electric signal means operable through appropriate circuitry to control the motor 19. Accordingly, the system shown in my copending application Ser. No. 623,377 filed Mar. 15, 1967 entitled "Film Speed Control Apparatus" could be used instead of the system shown herein, if desired.

As here shown, the speed sensor is in the form of a tachometer generator providing a direct current voltage level dependent on the speed of the film and a circuit herein designated as tachometer generator circuit 53. This direct current voltage is communicated to one input of a differential amplifier circuit 54, and a reference voltage source in the form of potentiometer circuit 56 is communicated to the other input of the differential amplifier 54. The differential amplifier circuit 54 responds to these two signals to produce an error signal proportional to their difference, and this error signal is then fed to an amplifier and inverter circuit 57. Preferably, an acceleration control or damping circuit is also provided in this system to render beginning acceleration more uniform and smooth out the velocity curve.

The amplified and inverted error signal is then fed to one input terminal of a gate circuit 58, while the other input terminal receives a sawtooth wave from the sawtooth wave generator circuit 59. Interposed between the sawtooth wave generator 59 and gate 58, is a sawtooth isolation amplifier circuit 61. This amplifier circuit is provided because the sawtooth wave generator operates through two gates, and the signals must be isolated from each other to prevent them from interfering with the proper operation of the sawtooth generator. It should also be noted that the sawtooth wave generator circuit 59 produces a sawtooth wave in synchronism with each half cycle of the alternating current supplied to the motors 16 and 19.

The gate circuit 58 responds to the error signal from the amplifier and inverter circuit 57 and the sawtooth wave from sawtooth wave generating circuit 59 to produce an output signal during the time the amplitude of the sawtooth wave exceeds the level of the error signal. This output signal is communicated to a SCR trigger amplifier circuit 62 which appropriately amplifies, shapes and conditions the output for supply to the SCR diode bridge circuit 63. This diode bridge circuit 63 controls the duration of current flow in appropriate AC source lines, which current is then utilized to operate the DC takeup motor 19 through the rectified bridge circuit 64.

In this way, the takeup motor is controlled by the speed of the film passing through the film gate means and compared to a preset reference speed so as to drive the motor accurately and uniformly. Since the control circuit is electronic in nature, the responses to changes are virtually instantaneous so as to provide excellent and immediate control. In other words, the speed may be driven within one percent error from the desired preset speed with the control device illustrated herein.

In order to assist the takeup motor 19 and quickly bring the film up to speed, the supply reel 14 is provided with energy from supply motor 16, and it is important to control the supply motor 16 so as to provide as much energy as is desirable, and yet positively prevent the exceeding of the desired amount of energy thereto.

Accordingly, the energy to the supply motor is controlled by the length of the strip of film between the two reels as sensed through a film tension sensor which is spring biased to allow the length of film to slightly decrease while becoming more tense, and conversely allowing the film length to become slightly longer when less tense but still taut by relaxing the spring tension on device 27. This tension sensing device is formed to rotate a potentiometer which is in a tension sensor circuit 66. This tension sensor circuit 66 provides a signal to amplifier circuit 67 and thence to DC amplifier and inverter 68 where the signal is amplified and inverted so as to produce a signal level determined by the film tension. This signal is then placed to the input terminal of gate 69 while the other input terminal of gate 69 receives a sawtooth wave from sawtooth wave generator 59.

The gate circuit 69 responds to the signal from the amplifier and inverter circuit 68 indicative of the film tension and the sawtooth wave from sawtooth wave generating circuit 59 to produce an output signal during the time the amplitude of the sawtooth wave exceeds the level of the inverted film tension signal. This output signal is then communicated to a SCR trigger amplifier circuit 71 which supplies a trigger impulse to the SCR diode bridge circuit 72, which in turn allows current to flow through a controlled fraction of the total cycle time of the AC supply current. This supply current from the diode bridge circuit then goes through a suitable rectifying bridge circuit 73 to DC supply motor 16 for driving of the supply reel 14.

In operation, the camera is placed on one side of a moving object 31 which may be a rocket sled as illustrated in FIG. 2. In this position, the camera reels are moving clockwise so as to pull the film across the film gate in a direction in opposition to the direction of the moving object. With this setup, the reversed image of the moving object 31 is moving in the same direction as the film. The film speed control mechanism is set by operation of potentiometer circuit 56 to provide the expected linear film speed to match the image speed from the moving object.

Calculation of expected speeds and procedures for this determination may be accomplished by any of the techniques now in use, or by any suitable method whereby matching arrangement is best achieved. The film is then threaded as shown in FIG. 2 so that the film tension sensing means 27 senses the tension between the feed spool 14 and sprocket 28, and the film passes directly from sprocket 28 to takeup spool 18 in direct driving relation. A mechanical brake is provided on the supply spool 14 so that the spool is held stationary when the film is completely slack around tension sensing mechanism 27. Thus with the film threaded for beginning operation, it is brought up so that it just begins to pull against film tension sensing mechanism 27 and is sufficiently started on the takeup spool that it will wind up as desired.

With the camera mounted and set up in this fashion, the object to be photographed or rocket is operated and the camera is turned on so that the camera will be up to speed and moving at a uniform speed when the object appears in front of it, yet there will be adequate film left to provide the desired picture. As the camera is turned on, the supply motor is first operative because the reference signal overrides the inverted signal coming from the tachometer generator and fires the SCR trigger quite early in each phase so as to supply maximum current to the takeup motor. As soon as the takeup motor begins, the film pulls against the tension sensor 27, automatically releasing the mechanical brake, and bringing the tension potentiometer in position for supplying current to the supply reel.

This chain of events occurs quite rapidly, and the supply motor starts driving the supply spool almost immediately after the takeup reel has begun operating. With both motors driving, the desired speed is soon reached. When the desired speed is reached, the control circuits are operative to feed just sufficient current to the reel motors to keep them at the proper speed, and no more. An important feature of this invention is to provide that the supply motor cannot operate unless the takeup motor is operating. In this way, any tendency of the supply motor to drive faster and override the takeup motor is reduced or eliminated.

When the film is completely drawn off the supply reel, the brake on the supply reel is automatically applied and a film sensor switch cuts off the main supply line to both motors. In this way, the camera is automatically stopped.

The camera is extremely accurate in indicating the actual velocity of the object photographed, and other data, by virtue of the knowledge of the film speed, and geometric data including focal length and distance of the lens from the object being photographed. In addition, the object will be lengthened or shortened a small amount if exact synchronization of speed is not achieved, and the error in synchronization can be calculated from these altered dimensions. Accordingly, it is desirable in cameras of this nature to provide an exact measure of film speed. This is achieved by placing a timing light 29 in the aperture of the camera.

This timing light 29 flashes periodically like a strobe light and at each flash it places a mark on the side of the film. An extremely accurate measure of the average film velocity is then obtained by measuring the distance between the marks and dividing by the time duration between light flashes. Since the camera operates at an extremely uniform velocity during the photographing operation, this average velocity is an extremely accurate measure.

It should also be noted that the timing light 29 is placed at a side of the aperture so that it does not unduly interfere with the pictures being taken. It is also important to place the light in exact central alignment with the aperture slit, so that it will operate to provide accurate marking no matter which direction the film is moving in accordance with the reversability feature of this invention.

In order to take a picture from the opposite side as shown by the camera indicated in dotted lines in FIG. 2, the supply reel is simply operated as the takeup reel and the former takeup reel is simply operated as the supply reel with the reels moving counterclockwise as indicated. The film is also threaded differently so that the film tension sensing means 27 is still located between the supply reel and the sprocket. In order to achieve this desired change, the supply and takeup motor are similarly constructed and the difference resides in the supply and takeup control circuit. Accordingly, when reversal is desired, the takeup motor is still driven from bridge 64 controlled in the same way and the supply motor is still driven from bridge 73 controlled in the same way. However, the motors are unplugged from their connections within the bridge and reversed as shown in FIG. 5 so as to provide the switchover.

As may be seen in FIG. 5, the field and armature of the left-hand motor will drive in, say, a clockwise direction when wired as indicated. When this motor is moved over so that it is plugged into the right-hand bridge, the armature will move in reverse, because of the reverse order of connection of the armature terminals. By the same token, the right-hand motor is wired to turn in the same or clockwise direction as the left-hand motor and shifting of this motor from bridge 73 to bridge 64 will reverse the direction of current flow through its armature. Accordingly, it is seen that by changing the connections, the motors not only have a shift in control, as desired, but they also will drive in reverse direction, as is also desired.

When swapping reel functions as indicated above, it is also important to shift the brake from one reel to another. This shift is shown in FIG. 3, where the solid line position is indicated for a clockwise rotation corresponding to the bottom camera or solid representation in FIG. 2, while the other position as shown in dotted lines and corresponds to the upper or dotted camera indication in FIG. 2.

As shown in the schematic representation in FIG. 3, each mechanical brake has a brake arm 32 rotatable by movement of the arm in a downward position (as shown in the drawing), to tighten bands 33. The brake is actuated by a tension spring 34 tending to rotate arm 36 of the film tensing means 27 which in turn pulls pivoted arm 37 downward and causes pin 38 to operate the brake arm. As the film 22 tightens it pulls against spring 34 and releases the brake.

It will also be noted that the rotation of arm 36 is indicative of the change in length of film, which also corresponds to the spring tension 34 and film tension. This arm 36 then rotates the rotor portion of a potentiometer 39 to provide the mechanical portion of potentiometer circuit 56 discussed above. In this way, the power to the supply reel 14 is increased or decreased depending on the rotational position of arm 36.

In order to shift the brake when it is desired to reverse the camera as indicated in FIG. 2, a lever 41 is rotated. This lever rotates arm 42 and arm 37, which are connected together through a linkage 43.

From the foregoing description, it is seen that reversal of film direction is achieved simply by swapping motor plugs and operating lever 41 to reverse the brake. Since all of the mechanical drive components and so forth operate in the same way, the shift assures that the camera will drive equally well in both directions.

While the foregoing description serves to illustrate the preferred embodiment of the invention, an example of a suitable electronic circuit capable of carrying out the functions described in connection with FIG. 4 is shown in detail in FIG. 6. However, it should be understood that this circuit is illustrative only and that various changes and modifications may be made within the ambit of the present invention.

Referring more particularly to the electronic control circuit in FIG. 6, the reference supply of potentiometer circuit 56 is adjusted by manually setting the potentiometer 81 to correspond to the desired film speed. Under these starting conditions transistor 82 will be conducting because there will be no voltage developed across the tachometer operator 53, and transistor 83 will be substantially cutoff.

When the camera is turned on, both the takeup motor and the supply motor will operate, as will be more apparent hereafter, and the tachometer then starts generating voltage. When the voltage generated by the tachometer reaches the voltage set in potentiometer 81, transistor 83 becomes conductive. As soon as transistor 83 becomes conductive, this voltage drops down, and the collector of transistor 83 is no longer at supply level, but decreases. This causes current to flow through the emitter resistor of transistor 84, the diode 86, and transistor 83, thereby turning transistor 84 on.

When transistor 84 of amplifier and inverter circuit 57 thus come "on," the collector of transistor 84 comes up above ground or increases its voltage. This increase in voltage is compared to the saw wave by emitter gate circuit 58. A typical saw will have a 15 volt peak amplitude recurring at the rate of 8.3 milicycles in phase with the AC line. The comparison will generate no output signal unless the comparison is beneath the saw, and the output operates the SCR trigger to supply power to the takeup motor.

In other words, when the camera is first starting up, little or no voltage is developed from amplifier circuit 57, and the saw is in excess thereof for a maximum period to provide maximum supply. As the tachometer increases in speed, increased voltage or a larger difference signal is provided in difference amplifier circuit 54, through amplifier 57 to the gate circuit 58. This reduces the time the saw voltage is in excess, thereby reducing the supply to the motor. When the motor reaches the desired speed, this signal will compare to the saw so that just the right amount of current will flow through the supply lines.

Referring again to gate 58, it is seen that transistor 87 has its emitter terminal connected to the emitter terminal of transistor 88. The input signal from amplifier circuit 57 is taken through line 89 to the base of transistor 87, and the sawtooth wave is taken through line 91 to the base of transistor 88. The output of the gate is taken from the collector of transistor 88 in the following manner. Each time the amplitude of the sawtooth wave on the base of transistor 88 exceeds the signal on the base of transistor 87, both transistors 87 and 88 will conduct, dropping the potential at the collector of transistor 88. This drop in potential constitutes the output signal of the gate circuit and is communicated through a resistor 91 and a capacitor 92 to the base terminal of a transistor 93 in the SCR trigger amplifier circuit 62. The drop in potential causes transistor 93 to become conducting, and its conduction sends a pulse of current through the primary coil of a driver transformer 91. The secondary coil of the driver transformer transmits the pulse as a trigger pulse to the silicon controlled rectifiers 98 and 99 in the motor current control circuit 122 or SCR diode bridge 63.

The bridge 63 is interposed in one side of the alternating current supply line 101 leading to motor 19. The bridge circuit 63 is shunted across the middle by shunt line 102 and has silicon controlled rectifiers 98 and 99 connected in two of its legs in opposing relation to each other with their cathode terminals connected in common to shunt line 102. The remaining legs of the bridge circuit 63 are occupied by diodes 103 and 104 which are connected in opposing relation to each other with their anode terminals connected in common to shunt line 102. To complete circuit, the cathode terminal of diode 103 is connected in common with the anode terminal of silicon controlled rectifier 99 at the input of the bridge circuit 63, and the cathode of diode 104 The remaining legs of the bridge circuit 63 are connected in common with the anode of silicon controlled rectifier 98 at the output side of bridge 63.

It may be seen that with this bridge arrangement a current path exists through the bridge from the input end to the output end of the bridge for alternating current of either polarity when the silicon controlled rectifiers 98 and 99 are conducting. During the positive swing of the alternating current line, current will pass from the input of bridge 63 through silicon controlled rectifier 99 if its gate terminal has received a trigger pulse, and then through shunt line 102 and diode 104 to the output of bridge circuit 63. During the negative swing of the alternating current line, a current path exists from the input of bridge 63 through diode 103, shunt line 102, and silicon controlled rectifier 98 if its gate terminal has received a trigger pulse, and to the output of bridge circuit 63.

The gate terminals of silicon controlled rectifiers 98 and 99 are connected in common to one side of the secondary winding of the driver transformer 97 to receive the trigger pulse from transistor 96. Although both silicon controlled rectifiers receive the trigger pulse, only one of them will conduct in response to it, as only one of them will be forward-biased when the trigger pulse is received. During the positive swing of the alternating current line, silicon controlled rectifier 99 is forward-biased, and on receipt of a gate pulse will conduct, and silicon controlled rectifier 98 is reverse biased and will not conduct despite the receipt of a gate pulse. During the negative swing of the alternating current line, silicon controlled rectifier 99 is back-biased and silicon controlled rectifier 98 is forward-biased.

The lower the level of the signal input to the gate circuit on line 89, the earlier in each half cycle of the alternating current line the sawtooth wave output of sawtooth wave generator 59 will exceed the voltage level of the signal, and the earlier in each half cycle of the alternating current the gate circuit 88 will produce its output to the SCR trigger amplifier 62. The earlier in each half cycle of the alternating current line that the SCR trigger amplifier provides a pulse to the silicon controlled rectifiers 98 and 99, the greater the proportion of time during that half cycle that current will be passed through the bridge circuit 63 to the motor 19. It may be seen then that a low signal on line 89 as a result of a great discrepancy between the setting of reference supply potentiometer 81 and the voltage output of tachometer circuit 53 which is proportional to the actual camera speed, the greater will be the current supplied to the motor 19.

On the output side of bridge 63 is a full wave rectifying bridge 64 for rectifying the current supplied to motor 19. As shown in FIG. 5, it is within this bridge that plug connections are provided for exchanging the motor drives when it is desired to reverse the film movement through the film gate.

In the circuits 54, 56, 57, 58 and 62, DC power is provided by main lines 76 and 77 from a regulated DC power supply circuit 74 supplying power also to lines 78 and 79. The regulated DC power supply 74 includes a transformer 106 connected to AC supply line 101 and having its secondary windings connected to the full wave rectifying bridge circuit 107. The output of the bridge is regulated in a conventional manner with transistor 108, Zener diode 109, and resistors and capacitors as shown.

The sawtooth wave generator circuit 59 includes a pair of transistors 111 and 112, with the collector of transistor 111 connected to the base of the transistor 112 and the base of transistor 111 connected through a resistor 113 to the full wave rectified unsmoothed output of the bridge circuit 107 in regulated DC power supply 74. Transistor 11 thus becomes conducting during the increase in amplitude on each half cycle of the alternating current supply line and ceases conduction on each half cycle as the output of bridge circuit 107 falls back toward zero. As transistor 111 becomes conducting, the drop of potential at its collector terminal drops the potential on the base terminal of transistor 112 so that transistor 112 ceases conducting, permitting a capacitor 114 to charge through resistor 116.

When the voltage input to the base of the transistor 111 falls back toward zero and transistor 111 ceases conduction, the potential at the base terminal of transistor 112 rises correspondingly causing transistor 112 to resume conduction and drain the charge off of capacitor 114. The output of the sawtooth wave generator circuit 59 as developed at resistor 117 is therefore in the form of a sawtooth wave rising along a substantially steady slope on each half cycle of the alternating current line frequency as capacitor 114 charges, and then falling abruptly as capacitor 114 rapidly discharges through transistor 112 when transistor 112 is conducting.

This saw wave is directed to the base of transistor or emitter follower 118 of sawtooth isolation amplifier circuit 61. In this way, the sawtooth wave generator is not affected by either gate. Otherwise, the gate would draw current and reduce the height of the saw. As explained above, the height of the saw wave affects motor performance. However, the amplifier circuit 61 provides sufficient power through its output line 119 to operate both gate 58 and gate 69.

In order to control the supply motor 16, tension sensor circuit 66 having potentiometer 121 cooperates with transistor 122 of amplifier circuit 67. The transistor 122 has its base held at a fixed voltage through line 123. The emitter of transistor 122 is fed into the potentiometer 121 so that as film tension increase, the potentiometer wiper-arm goes down to reduce resistance, and thus tends to cut the transistor off. In this way, line 124 from the collector of transistor 122, puts a reduced signal to the base of transistor 126 of amplifier and inverter circuit 68. This, in turn places a reduced signal in output line 127 of transistor 126, which line 127 is an input line for gate circuit 67.

Gate 69 is similar to gate 58 and provides a comparison against the sawtooth wave so that when the saw level exceeds the input from the film tension sensor, a pulse is provided to drive the supply motor. Thus, as film tension increases, the pulse to the SCR trigger from the gate occurs earlier in each cycle, and the supply motor receives more energy tending to drive film out and reduce film tension. As film tension is reduced, the potentiometer 121 has increased resistance, and the signal from transistor 122 is increased. This increases the signal from transistor 126 and shifts the position during the cycle that the saw wave exceeds this signal. Thus power to the supply motor is reduced.

Referring again to gate 69, it is seen that transistor 128 has its emitter terminal connected to the emittor terminal of transistor 129. The input signal from amplifier circuit 67 is taken through line 127 to the base of transistor 128, and the sawtooth wave is taken through line 131 to the base of transistor 129. The output signal of the gate is taken from the collector of transistor 129 in the following manner. Each time the amplitude of the sawtooth wave on the base of transistor 129 exceeds the signal on the base of transistor 128, both transistors 128 and 129 will conduct, dropping the potential at the collector of transistor 129. This drop in potential constitutes the output signal of the gate circuit and is communicated through a resistor 132 and a capacitor 133 to the base terminal of a transistor 134 in the SCR trigger amplifier circuit 71. The drop in potential causes transistor 134 to become conducting, and its conduction sends a pulse of current through the primary coil of a driver transformer 136. The secondary coil of the driver transformer transmits the pulse as a trigger pulse to the silicon controlled rectifiers 137 and 138 in the motor current control circuit 122 or SCR diode bridge 72.

The bridge 63 is interposed in one side of the alternating current supply line 101 in series with SCR diode bridge 63. In this way, no power will go through the SCR diode bridge 72 unless power is also going through the SCR diode bridge 63 and energizing the takeup motor 64. This provides an important feature of the invention, namely that the power control to the supply motor is in slave relation of the power supply to the takeup motor.

The bridge circuit 72 is shunted across the middle by shunt line 139 and has silicon controlled rectifiers 137 and 138 connected in two of its legs in opposing relation to each other with their cathode terminals connected in common to shunt line 139. The remaining legs of the bridge circuit 72 are occupied by diodes 141 and 142 which are connected in opposing relation to each other with their anode terminals connected in common to shunt line 139. To complete the circuit, the cathode terminal of diode 141 is connected in common with the anode terminal of silicon controlled rectifier 138 at the input of the bridge circuit 72, and the cathode of diode 142 is connected in common with the anode of silicon controlled rectifier 137 at the output side of bridge 72.

This bridge arrangement is similar to that of bridge 63, and a current path exists through the bridge from the input end to the output end of the bridge for alternating current of either polarity when the silicon controlled rectifiers 98 and 99 are conducting. The operation of the bridge is the same as that of bridge 63, and therefore will not be repeated.

On the output side of bridge 72 is a full wave rectifying bridge 73 for rectifying current supplied to motor 14. As shown in FIG. 5, plug fittings are also provided within this bridge for reversing the reel connections. It will be noted from FIG. 5 that the armature connection within bridge 73 is in reverse order to that in bridge 64. This assures reversal of motor rotation when the plugs are exchanged.

Other components may be added to the circuit, if desired. For example, an acceleration control circuit is now shown in association with tachometer generator circuit 53. It comprises a transistor 143 together with resistors and capacitors, as shown in FIG. 6, to provide a controlled substantially constant acceleration during starting. In this way, the film strength may be considered and acceleration forces that are likely to break the film avoided. At the same time, maximum speedup is obtained.

From the foregoing description, it is seen that an improved high speed drive system is provided for cameras, and that this system is capable of rapidly achieving a desired preset film velocity, and accurately maintaining same. It is also seen that the drive system is especially suitable for streak cameras, and equally suitable for forward as well as reverse drive.

I claim:

1. A camera having a high speed drive system comprising,
   a housing for carrying the various camera components,
   a supply spindle formed for supporting a film feed reel within said housing,
   a takeup spindle adapted for supporting a film takeup reel within said housing,
   an electric takeup motor connected in driving relation to said takeup spindle and powered by a first electric supply source,
   an electric supply motor connected in driving relation to said supply spindle and powered by a second electric supply source,
   a film gate mounted in said housing and formed for positioning film passed therethrough as it is moved between reels by said motors,
   optical means carried on the housing and including an objective lens system and formed to receive and direct a beam of light from said objective lens system onto the film at the film gate means,
   speed detecting means operatively associated with the film movement through the film gate for detecting the speed of the film movement through the film gate and providing a first electric signal indicative of said speed,
   film tensioning means formed for providing tension to the film located between the supply motor and the film gate with the tension varying in response to the length of film between the supply reel and the film gate,
   tension sensor means for providing a second electric signal responsive to the film tension, and
   control means in the form of an electronic circuit means comprising
   a first circuit formed for reception of the signal from said speed detecting means and associated with said first electric supply source for controlling the energy delivered to said electric takeup motor, and
   a second control circuit formed for reception of the second electric signal responsive to the film tension and associated with said second electric supply source for controlling the energy delivered to said supply motor, whereby said motors rapidly achieve the desired speed of film through the film gate and maintain the film at said desired speed.

2. The high speed camera defined in claim 1, in which the second control circuit and second electric supply source are formed to positively assure that the supply motor will be powered only when the takeup motor is powered.

3. The high speed camera defined in claim 2, in which the supply motor and takeup motor supplies can be switched to reverse the power to the supply and takeup spools, and in which the control circuit means is formed to reverse the operation of the first and second circuits to accommodate said reversal, and means are also provided to reverse the driving rotation of the motors.

4. The high speed camera defined in claim 3, in which both the supply spindle and the takeup spindle are provided with a brake means for connecting the brake on the supply spindle to a film tension detecting means whereby the brake is responsive to the film tension of the film moving between the reels, and means are also provided for switching the brake connection so that either spindle may serve as a supply spindle.

5. A streak camera comprising a housing for carrying the various camera components, a supply spindle formed for supporting a film feed reel within said housing, a takeup spindle adapted for supporting a film takeup reel within said housing, an electric takeup motor connected in driving relation to said takeup spindle and powered by a first electric supply source, an electric supply motor connected in driving relation to said supply spindle and powered by a second electric supply source, a film gate mounted in said housing and formed for positioning film passed therethrough as it is moved between reels by said motors, optical means carried on the housing and including an objective lens system and a slit for directing light from the object to be photographed to the film at the film gate, speed detecting means operatively associated with the film movement through the film gate for detecting the speed of the film movement through the film gate and providing a first electric signal indicative of said speed, film tensioning means formed for providing tension to the film located between the supply motor and the film gate with the tension varying in response to the length of film between the supply reel and the film gate, tension sensor means for providing a second electric signal responsive to the film tension, and control means in the form of an electronic circuit means comprising a first circuit formed for reception of the signal from said speed detecting means and associated with said first electric supply source for controlling the energy delivered to said electric takeup motor, and a second control circuit formed for reception of the second electric signal responsive to the film tension and associated with said second electric supply source for controlling the energy delivered to said supply motor, whereby said motors rapidly achieve the desired speed of film through the film gate and maintain the film at said desired speed.

6. The streak camera defined in claim 5, in which the second control circuit and second electric supply source are formed to positively assure that the supply motor will be powered only when the takeup motor is powered.

7. The streak camera defined in claim 6, in which the supply motor and takeup motor electric supply sources can be switched to reverse the power to the supply and takeup spools, and in which the control circuit means is formed to reverse the operation of the first and second control circuit to accommodate said reversal, and means provided also to reverse the driving rotation of the motors.

8. The streak camera defined in claim 7, in which both the supply spindle and the takeup spindle are provided with a brake means for connecting the brake on the supply spindle to tension sensor means whereby the brake is responsive to the film tension of the film moving between the reels, and means are also provided for switching the brake connection so that either spindle may serve as a supply spindle.

9. The streak camera defined in claim 8, in which a timing light is provided at one side of and centered with respect to the slit for providing timed marks on the film.

10. The streak camera defined in claim 5, in which the film gate comprises a sprocket, and in which the speed detecting means is a tachometer generator connected to said sprocket.

11. The streak camera defined in claim 10, in which the control circuit comprises a speed adjusting potentiometer wired in opposed relation to the film detecting means to provide an error signal for driving the takeup motor at a desired selected speed.

12. The streak camera defined in claim 5, in which the tension sensor means for providing a second electric signal comprises a potentiometer responsive to the movement of the film tensioning means.

13. In a streak camera comprising a housing carrying a supply and takeup reel, a film gate mounted in said housing for guiding a strip of film through an exposure position, an aperture in the form of a slit oriented perpendicular to the axis of the film strip at the film gate, optical means carried on the housing and formed to receive and direct a beam of light to an image at the exposure position and an electric motor carried in driving relation to said takeup reel, in combination, a speed control means capable of rapidly bringing the film to the desired speed and maintaining said speed, comprising speed detecting signal means mounted for detecting the speed of film passing through the film gate and providing an electric signal indicative thereof, reference signal means for providing an electric signal corresponding to a desired speed of film through the film gate, a motor supply circuit for providing energy to said electric motor, and a control circuit formed to receive and compare said speed detecting signal and said reference signal and control the amount of energy delivered by the supply circuit in accordance with said comparison.

14. A streak camera as defined in claim 13, in which a sprocket is mounted for free rotation at the film gate for holding the film in position thereat and rotating in coupled movement with the filmstrip passing through the film gate.

15. A streak camera as defined in claim 14, in which the speed detecting signal means is a tachometer generator, and the reference signal means is a potentiometer.

16. A streak camera as defined in claim 15, in which the control circuit comprises a gate, a sawtooth generator for providing sawtooth waves to said gate, a difference amplifier for receiving the speed detecting signal and reference signal and providing a comparison signal to said gate, said comparison signal and said sawtooth wave being matched at the gate to provide a pulse signal at a phase angle determined by the comparison signal, and in which the supply circuit contains a silicon-controlled rectifier operative to supply current to the motor only during the fraction of the phase period remaining after receipt of said pulse signal.

17. A streak camera as defined in claim 14, which also comprises a supply motor mounted in driving relation to the supply reel, a film tension sensor mounted between the supply reel and the sprocket and formed to move its position in response to the length of film between the supply reel and the sprocket, and a supply motor control circuit for controlling the power to operate the supply motor in accordance with the length of film between the supply reel and the sprocket, whereby the supply motor tends to drive the supply reel when the film supply is behind that removed by the takeup reel and cease driving the supply reel when the film supply catches up to that removed by the takeup reel.

18. A streak camera as defined in claim 17, which also comprises means for braking the supply motor.

19. A streak camera as defined in claim 18, in which the power to operate the supply motor is turned on only when the takeup motor is supplied with power.